US012565304B2

(12) United States Patent
Kokorich et al.

(10) Patent No.: US 12,565,304 B2
(45) Date of Patent: Mar. 3, 2026

(54) HEAT EXCHANGERS FOR AIRFRAMES

(71) Applicant: DESTINUS SA, Payerne (CH)

(72) Inventors: Mikhail Kokorich, Payerne (CH); Bart Van Hove, Payerne (CH)

(73) Assignee: DESTINUS SA, Payerne (CH)

( * ) Notice: Subject to any disclaimer, the term of this patent is extended or adjusted under 35 U.S.C. 154(b) by 0 days.

(21) Appl. No.: 18/875,095

(22) PCT Filed: Jun. 15, 2022

(86) PCT No.: PCT/EP2022/066290
§ 371 (c)(1),
(2) Date: Dec. 13, 2024

(87) PCT Pub. No.: WO2023/241790
PCT Pub. Date: Dec. 12, 2023

(65) Prior Publication Data
US 2025/0368314 A1      Dec. 4, 2025

(51) Int. Cl.
B64C 1/38          (2006.01)
B64C 1/36          (2006.01)
(Continued)

(52) U.S. Cl.
CPC ................. B64C 1/38 (2013.01); B64C 1/36 (2013.01); B64D 13/00 (2013.01); B32B 3/30 (2013.01);
(Continued)

(58) Field of Classification Search
CPC ..... B64C 1/38; B64C 1/36; B64C 2001/0072; B64D 13/00; B32B 3/30; B32B 15/01; B32B 2605/18
See application file for complete search history.

(56) References Cited

U.S. PATENT DOCUMENTS

| | | | | |
|---|---|---|---|---|
| 8,568,054 | B2 * | 10/2013 | Etling | ..................... F16B 5/065 403/381 |
| 2005/0214067 | A1 * | 9/2005 | Cherian | ................... B64G 1/58 403/220 |
| 2010/0199583 | A1 * | 8/2010 | Behrens | ................... B64G 1/58 52/716.6 |

FOREIGN PATENT DOCUMENTS

| | | | | | |
|---|---|---|---|---|---|
| CN | 109264030 | A | * | 1/2019 | ............... B64G 1/58 |
| CN | 112027061 | A | * | 12/2020 | ............... B64C 1/40 |
| GB | 2462177 | A1 | | 2/2010 | |

OTHER PUBLICATIONS

International Search Report and Written Opinion dated Feb. 1, 2023 for International Application No. PCT/EP2022/066290.

* cited by examiner

*Primary Examiner* — Kimberly S Berona
*Assistant Examiner* — Steven J Shur

(57)          ABSTRACT

The invention is notably directed to an aircraft, which includes an aircraft structure, a thermal exchange system, a thermal insulation material, and fasteners. The thermal exchange system includes a fluid-based cooling circuit and heat exchanger tiles. The latter cover, at least partly, the aircraft structure. They may thus form the skin of the aircraft. The fasteners secure the tiles to the aircraft structure. Each tile of the heat exchanger tiles embeds one or more fluidic channels, which are connected to the fluid-based cooling circuit, whereby the thermal exchange system is adapted to actively cool the tiles, in operation. Remarkably, the thermal insulation material extends between the aircraft structure and the heat exchanger tiles. The thermal insulation material is clamped on either side by the heat exchanger tiles and by the aircraft structure, thanks to the fasteners.

20 Claims, 7 Drawing Sheets

(51) Int. Cl.
     B64D 13/00        (2006.01)
     *B32B 3/30*           (2006.01)
     *B32B 15/01*        (2006.01)
     *B64C 1/00*          (2006.01)

(52) U.S. Cl.
     CPC ........... *B32B 15/01* (2013.01); *B32B 2605/18*
           (2013.01); *B64C 2001/0072* (2013.01)

HEAT EXCHANGERS FOR AIRFRAMES

CROSS-REFERENCE TO RELATED APPLICATION

This application is a national stage application, filed under 35 U.S.C. § 371, of International Patent Application No. PCT/EP2022/066290, filed on Jun. 15, 2022, which is incorporated by reference herein in its entirety.

BACKGROUND

The invention relates in general to the field of aircrafts, including spacecrafts and near-space vehicles, which comprise actively cooled heat exchanger tiles fixed onto the aircraft structure (airframe), as well as to methods of operating such aircrafts. In particular, the invention is directed to an aircraft having a thermal insulation material clamped between the aircraft structure and the heat exchanger tiles thanks to fasteners such as bolted joints, fixed in central areas of the tiles, where at least some of the fasteners may embed sensors.

The following documents form part of the background art:
  Becker, John V. "New approaches to hypersonic aircraft." International Council Of The Aeronautical Sciences, Congress, 7th. No. Icas Paper 70-16. International Council Of The Aeronautical Sciences, 1970 (hereafter referred to as [Becker]);
  Heldenfels, Richard R. "Historical perspectives on thermostructural research at the NACA Langley Aeronautical Laboratory from 1948 to 1958." NASA Symp. on Computational Aspects of Heat Transfer in Struct. No. L-15104. 1982 (hereafter referred to as [Heldenfels]);
  Shore, Charles P. Review of convectively cooled structures for hypersonic flight. No. NAS 1.15: 87740. 1986 (hereafter referred to as [Shore]);
  Kelly, H. Neale, and Max L. Blosser. "Active cooling from the sixties to NASP." NASA Conference Publication. NASA, 1992 (hereafter referred to as [Kelly]); and
  Victor Fernandez, Villace, and Johan Steelant. "The Thermal Paradox of Hypersonic Cruisers." Space Planes and Hypersonic Systems and Technology Conference, Date: 2015 Jan. 5-2015 Jan. 7, Location: Glasgow. 2015.

A challenge for supersonic and hypersonic aircrafts is to withstand high-magnitude heat fluxes, i.e., fluxes on the order of 10 kW/m$^2$ to 1 MW/m$^2$. Although atmospheric re-entry vehicles may withstand higher loads (up to 10 MW/m$^2$), they only do this for durations on the order of 5 to 10 minutes. By contrast, high-speed aircrafts operate for hours and must avoid accumulating large amounts of thermal energy, which makes the usual passive solutions (e.g., heat sinks, radiating, and ablating heat shields) unattractive.

Some aircraft and atmospheric entry vehicles are equipped with heat shields to protect the vehicle from overheating while flying. Such heat shields are usually designed to withstand aerodynamic heat but have limited ability to evacuate it. Radiation and conduction are the primary methods of heat evacuation. Ablating heat shields can also reduce heat penetration by shedding material and can reduce aerodynamic heating by outgassing into the boundary layer on the heat shield. Passive thermal systems are the norm for high-speed aircraft and other vehicles. The mass penalty of heat shields is significant, both in terms of structural weight and additional fuel needed. This is already a substantial drawback for short-duration missions (on the order of minutes) and becomes prohibitive for long-duration missions (on the order of hours) [Villace].

It has also been proposed to use active cooling systems for cooling high-speed aircraft. Such solutions move a coolant or a working fluid to evacuate heat more effectively. In particular, theoretical designs have been disclosed, which involve heat pipes, impingement cooling, transpiration cooling, film cooling, and convective cooling. To the inventor's knowledge, however, none of these systems have been implemented in operational aircraft. In practice, most convective systems use heat exchangers that are installed on the aircraft structure and simultaneously function as the aircraft skin, called high-level cooling. The underlying aircraft structure may be insulated from the heat exchanger (cold structure) or integrally connected to the heat exchangers (hot structure). For a given weight, cold structures are more durable [Heldenfels]. The thermal insulation of the cold structure from the skin heat exchanger is achieved with mechanical stand-off devices or additional heat exchangers between the high-level heat exchanger and the aircraft structure [Kelly, FIG. 9]. This increases the aircraft weight and can further introduce thermal expansion and stress problems due to the rigid construction. It has also been proposed to layer heat shields and thermal insulation material above heat exchangers, called low-level cooling [Becker, FIG. 5]. In the field of passive thermal solutions, metallic heat shields have been proposed that sandwich thermal insulation between two metal honeycomb sheets [Shore, FIG. 28]. Such panels are not cooled and are installed on the aircraft structure with regularly spaced mechanical fasteners.

SUMMARY

According to a first aspect, the present invention is embodied as an aircraft, which includes an aircraft structure, a thermal exchange system, a thermal insulation material, and fasteners. The thermal exchange system includes a fluid-based cooling circuit and heat exchanger tiles. The latter cover, at least partly, the aircraft structure. They may thus form the skin of the aircraft. The fasteners secure the tiles to the aircraft structure. Each tile of the heat exchanger tiles embeds one or more fluidic channels, which are connected to the fluid-based cooling circuit, whereby the thermal exchange system is adapted to actively cool the tiles, in operation. Remarkably, the thermal insulation material extends between the aircraft structure and the heat exchanger tiles. The thermal insulation material is clamped on either side by the heat exchanger tiles and by the aircraft structure, thanks to the fasteners.

The simple fastening solution and structural arrangement proposed (whereby the thermal insulation layer extends between the tiles and the aircraft structure elements) allow a durable and lightweight active cooling solution to be achieved, especially in high heat flux regions. The actively cooled tiles make it possible to save substantial weight compared to solutions relying on passive heat shields, because such solutions typically require more material, resulting in increased mass, which impact the performance and fuel consumption of the aircraft. In addition, the fastening solution and the structural arrangement reduce thermal stress concentrations and therefore increase the reliability and durability of rigid structures.

In embodiments, each tile of the heat exchanger tiles is secured to the aircraft structure via at least one fastener extending from a central area of said each tile to an opposite portion of the aircraft structure through a medial portion of the thermal insulation material, to apply an axial force securing said each tile to said opposite portion and squeezing said medial portion between said each tile and said opposite portion. Tests and simulations performed by the inventors in respect of fasteners securing tiles at their centres have demonstrated excellent mechanical performance of the resulting assemblies, be it in terms of stress resistance and thermal protection. In particular, using a single fastener (or a few fasteners) in the centre area of the tile allows for possible warping due to thermal expansion of the tiles. Still, additional fasteners may be relied on, be it in the central area and/or other regions of the tiles.

Preferably, the fasteners are bolted joints clamping the respective tiles with respective opposite portions of the aircraft structure, while squeezing the medial portions of the thermal protection material. A bolted joint is a simple, yet efficient fastener, which is easily assembled. A single bolted joint per tile may already be sufficient to aptly secure a tile. I.e., in embodiments, each of the tiles is secured to the aircraft structure by a single one of the fasteners, where each fastener preferably includes a single male treaded part inserted in a matching female threaded part.

For example, each of the bolted joints includes a male threaded part extending from a respective one of the tiles to an opposite portion of the aircraft structure. The male threaded part further extends through the opposite portion of the aircraft structure, so as to protrude inwardly from this portion of the aircraft structure. The male threaded part is secured at a level of its protruding portion with a matching female threaded part.

The male threaded part may advantageously be inserted in a thermally insulating washer, which is arranged on a side of the female threaded part, so as to be compressed by the female threaded part. The thermally insulating washer is shaped as a flange nut having a narrow portion and a wide flange (i.e., the flange is wider than the narrow portion). The narrow portion surrounds the male threaded part at the level of said opposite portion of the aircraft structure, so as to thermally insulate said opposite portion of the aircraft structure from the male threaded part. The female threaded part abuts against the wide flange to clamp said opposite portion of the aircraft structure. Such a washer design makes it easy to thermally insulate the airframe from both the male threaded part and the female part of the bolted joint, and hence the respective tile In embodiments, an outermost portion of said one fastener is housed in a cavity of said each tile, such that said one fastener does not protrude outwardly from said each tile. This cavity is preferably sealed. As a result, the fastener does not protrude outwardly from the tile and does accordingly not impact the aerodynamics of the aircraft. In variants, other types of fasteners can be used, such as blind bolts or screws, which are installed from below the heat exchanger.

In preferred embodiments, some of the fasteners may include sensors. That is, the fasteners include male treaded parts and one or more of the male treaded parts embed, each, at least one sensor. Such sensors may notably include one or more of a temperature sensor, a pressure sensor, a radiation sensor, and an antenna. Preferably, the at least one sensor is surrounded by a thermal insulation shell, itself embedded in each of said one or more of the male treaded parts. The thermal insulation shell preferably comprises ceramic. Having sensors embedded in fasteners make it possible to accurately sense environmental physical quantities, without impacting the tiling and the aerodynamics of the aircraft.

In preferred embodiments, the one or more fluidic channels of said each tile draw an essentially two-dimensional pattern extending over a greater part of the surface of said each tile. Preferably, a projected surface of the one or more channels (as projected on an average plane of said each tile) represents at least 40%, preferably more than 80%, and more preferably more than 90% of an average surface of said each tile. This makes it possible to cool down the entire tile uniformly and efficiently.

As per the present approach, the tiles are convectively cooled. In embodiments, the one or more fluidic channels of said each tile have, each, a fluid inlet arranged in a central area of said each tile and a fluid outlet arranged in a peripheral area of said each tile. Each of the fluid inlet and the fluid outlet is connected to the fluid-based cooling circuit. Note, the cooling circuit is not necessarily arranged as a closed refrigeration loop. Having the fluid inlet in the central area makes it possible to optimize the cooling. In particular, such a configuration favours the temperature uniformity, especially when combined with a channel spiralling across the entire tile, which, in turn, improves the cooling. That is, a single fluidic channel may advantageously be used to transport the coolant fluid in each tile, where the fluidic channel spirals outwards, i.e., from the central area (where the tile in the hottest, in operation) towards the peripheral area of said each tile.

In preferred embodiments, each of the heat exchanger tiles includes two bonded layers. An inner side of one or each of the two layers is grooved (e.g., engraved), so as to form said one or more fluidic channels, whereby clean, default-free channels can easily be achieved.

Preferably, the two layers are bonded (i.e., permanently attached) using diffusion bonding. Diffusion bonded layers give rise to compact (shallow) tiles, with solidly bonded layers, yet without damaging the inner channels or adding residual stress.

In embodiments, the heat exchanger tiles are preferably arranged so as to provide residual gaps between the tiles under standard ambient temperature and pressure. Preferably, such gaps are between 1 and 10 mm, while an effective coefficient of linear thermal expansion of the tiles is, on average, between 4 and $20\times10^{-6}$ K$^{-1}$. Thus, the tiles may initially form an unsealed shell, which progressively seals as the tiles uniformly expand.

In addition, most of the heat exchanger tiles will preferably have, each, a hexagonal shape, which has advantages in terms of thermal expansion. Compared to more conventional rectangular plates, the corners of a hexagonal are relatively closer to the geometrical centre of the tile. Hence the expansion and warping at the corners is relatively smaller. The symmetry of the hexagonal shape and the central support provided by the central fastener favour an essentially isotropic thermal expansion (in-plane). When expanding, possible misalignment between tiles does not lead to collisions, which may happen with rectangular tiles if their corners become offsets with respect to each other. Thus, the thermal expansion of the tiles does not jeopardize the structural integrity of the shell. On the contrary, in-plane constraints resulting from thermal expansion may possibly contribute to reinforcing the structural integrity of the shell.

In embodiments, the fluid-based cooling circuit includes one or more evaporators that are arranged, each, in thermal contact with the tiles. For example, each of these evaporators is in direct mechanical contact with one or more of the fasteners. In variants, one or more cooling circuit portions at outlets of one or more of the tiles are coiled around the evaporator. Thus, aerodynamic heating can be harnessed to help evaporate the liquid coolant.

According to another aspect, the invention is embodied as a method of operating an aircraft. The method basically comprises flying an aircraft such as described above and operating the fluid-based cooling circuit to circulate a cooling fluid through the one or more fluidic channels of each of the tiles to cool down the heat exchanger tiles.

In preferred embodiments, the method further comprises: harnessing aerodynamic heating, while flying the aircraft, to evaporate a liquid coolant and form the cooling fluid as a gas; circulating the gas formed through the one or more fluidic channels, wherein the liquid coolant preferably includes $H_2$; and, preferably, sensing one or more physical quantities via one or more sensors embedded in one or more of the fasteners.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings:

FIG. 6A shows an evaporator in direct mechanical contact with fasteners, while FIG. 6B shows cooling circuit portions coiled around an evaporator, as involved in embodiments;

Figure 1A:
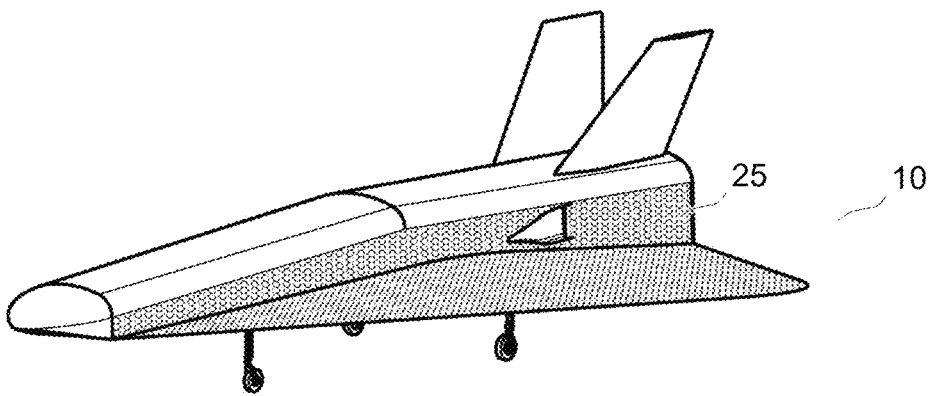
FIGS. 1A and 1B respectively show a 3D view and a front view of a high-speed aircraft, the internal structure of which is partly covered by hexagonal heat exchanger tiles, forming a skin of the aircraft, as in embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

Aircrafts and methods embodying the present invention will now be described, by way of non-limiting examples.

DETAILED DESCRIPTION OF EMBODIMENTS OF THE INVENTION

A first aspect of the invention is now described in detail, in reference to FIGS. 1A-5. This aspect concerns an aircraft 10 such as shown in FIGS. 1A and 1B.

As usual, the aircraft includes an aircraft structure 20. The aircraft structure or airframe is the internal load bearing structure. It is a structural assembly, typically made from frames, stringers, spars, ribs, and panels, which are typically machined or formed from sheet metal.

The aircraft further includes a thermal exchange system. The thermal exchange system includes a fluid-based cooling circuit 70-73 and heat exchanger tiles 25, which are connected to the cooling circuit. The heat exchanger tiles (or tiles, for short) 25 effectively act as heat exchangers, as explained below.

Figure 1B:
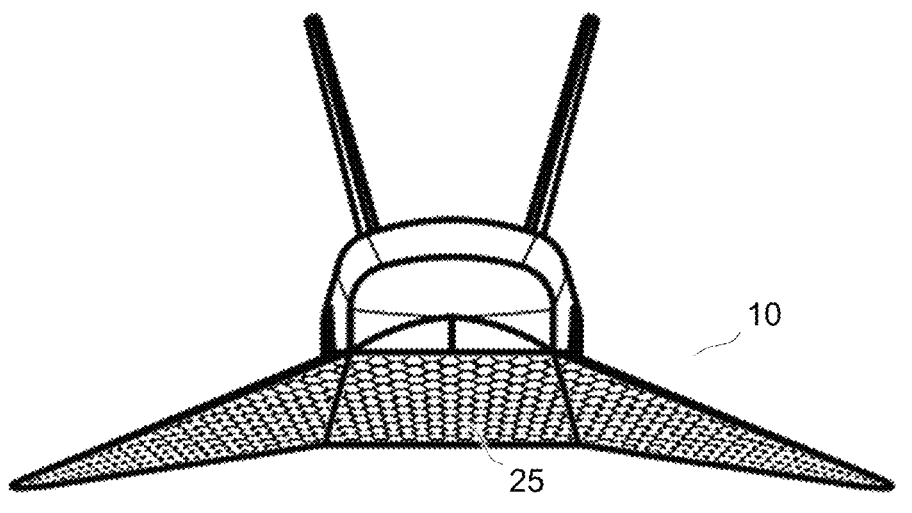

The tiles cover, at least partly, the aircraft structure 20, as illustrated in FIGS. 1A and 1B. The tiles 25 can be affixed with any component of the aircraft structure. However, the tiles are preferably fixed to load bearing elements or load transmission elements. For example, the tiles can be fixed to spars 20s and ribs 20r of the wings, as assumed in FIG. 2.

The tiles preferably have a polygonal shape (e.g., hexagonal), whereby the tiles can form a compact 2D tiling, which is locally ordered (and thus periodic). However, the 2D tiling is, as a whole, likely aperiodic. Using hexagonal tiles has advantages in terms of thermal expansion, as discussed later in detail. If necessary, distinct polygonal shapes may be used to complete the outer skin, or a portion thereof. I.e., the 2D tiling may cover part or all of the external surface of the aircraft 10, by way of non-overlapping polygons. The outer shell formed by the tiles preferably forms an unsealed structure, which is partly open at the level of the joints between the tiles, owing to small residual lateral gaps g provided to accommodate for thermal expansion of the tiles, as discussed later in detail.

Figure 5:
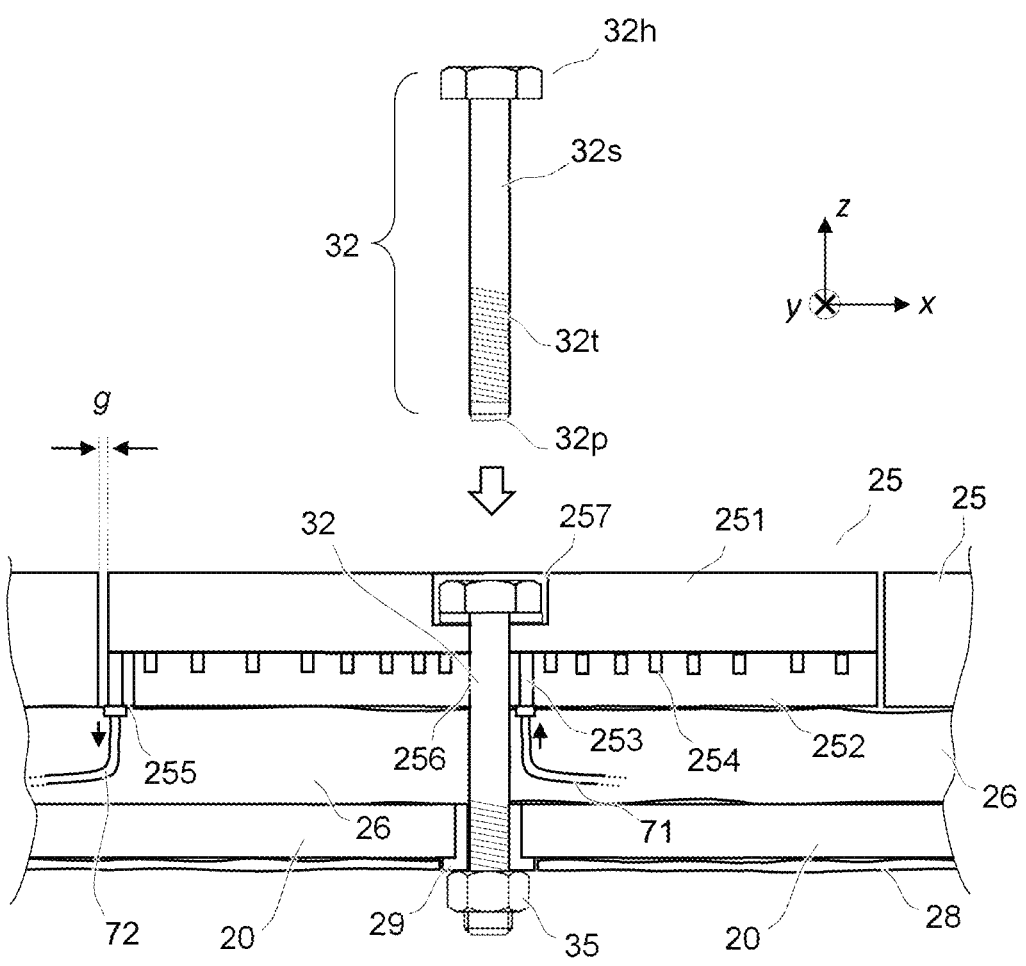
FIG. 5 is a 2D cross-sectional view of an outer portion of the aircraft, showing the heat exchanger tile of FIG. 4, once affixed with an aircraft structure element thanks to a bolted joint, where the thermal insulation material is clamped between this aircraft structure element and the heat exchanger tile, thanks to the bolted joint, according to embodiments.

The heat exchanger tiles 25 are secured to the aircraft structure 20 thanks to fasteners 32, 35, see FIG. 5. The tiles preferably form the outer skin of the aircraft, in which case they can be referred to as skin heat exchangers. In all cases, the tiles are mounted on the airframe (i.e., the underskin structure, which can have cut-outs) of the aircraft, via thermal insulation material 26.

The heat exchanger tiles 25 are actively cooled, in operation of the aircraft. To that aim, each tile embeds one or more fluidic channels 254, where the channels are connected to the fluid-based cooling circuit 70-73. I.e., the fluidic channels 254 are embedded in the thickness of the tiles. Such channels are in fluidic communication with the fluid-based cooling circuit 70-73. In other words, the fluid-based cooling circuit 70-73 and the embedded fluidic channels 254 form part of a same circuit. The cooling circuit 70-73 can be operated to circulate a cooling fluid in the fluidic channels 254, with a view to convectively cooling down the tiles, in operation of the aircraft. That is, the thermal exchange system is adapted to actively cool down the tiles, to cope with aerodynamic heating.

The cooling fluid is typically a gas, although it may also be a supercritical liquid, in principle. So, the fluid is a liquid or a gas having no or a negligible surface tension. The gas may for instance contain or consist of $H_2$, obtained from liquid hydrogen (LH$_2$), e.g., via an evaporator harnessing heat produced by the aircraft, in operation, as in embodiments discussed later. So, the gas used to cool down the aircraft may possibly be the same as the gas used to propel the aircraft.

The aircraft further includes a thermal insulation material 26. In the present case, the thermal insulation material 26 extends between the aircraft structure 20 and the heat exchanger tiles 25, by contrast with heat exchangers installed underneath the thermal insulation layer. The thermal insulation material 26 is clamped on either side by the heat exchanger tiles 25 and by aircraft structure elements 20 (20s, 20r), thanks to the fasteners 32, 35. I.e., the thermal insulation material 26 is sandwiched, and typically squeezed, between the heat exchanger tiles 25 and the aircraft structure 20. That is, not only the fasteners 32, 35 secure the tiles to the aircraft structure but, in addition, they clamp the thermal insulation material 26 between the heat exchanger tiles 25 on one side and the aircraft structure 20 on the opposite side.

The thermal insulation material 26 may for instance be provided as thermal insulation layers arranged end to end between the airframe elements and the tiles. The material 26 preferably includes a foam or fibrous material, which can for instance be rockwool, a silica-based material, or any other good thermal insulator. If necessary, a radiation shielding material layer 28 may further be provided, which extends below the aircraft structure 20, as assumed in FIG. 5.

The proposed approach relies on actively cooled thermal exchanger tiles, which are fixed to the aircraft structure 20 (i.e., on airframe elements such as spars and ribs) thanks to fasteners 32, 35 clamping the tiles, where such fasteners preferably extends from a central area of the tiles. As per the proposed arrangement, the thermal insulation layer is clamped, i.e., sandwiched, between the tiles and the aircraft structure elements on which the tiles are fastened.

The clamp load can be finely tuned, while the fluidic channel design can be adapted to accommodate the fasteners. In other words, the idea is to leverage active cooling to reduce the heat load to the outer heat exchangers 25, which can serve as an aircraft skin to protect the structure, as opposed to having heat exchangers installed underneath the thermal insulation layer. Thus, there is no need to provide an outer skin encasing the tiles, which allows to save weight.

In principle, the proposed solution may possibly be complemented by a passive heat shield encasing the heat exchanger tiles, where the passive heat shield can be formed as a layer of material covering the tiles. In preferred embodiments, however, the aircraft is free of such an additional passive heat shield. The simple fastening solution and structural arrangement proposed (whereby the thermal insulation layer extends between the tiles and the aircraft structure elements) allow a lightweight active cooling solution to be achieved, which makes it possible to save substantial weight compared to solutions relying on passive heat shields, because such solutions typically require more material, resulting in increased mass, which impact the performance and fuel consumption of the aircraft.

For completeness, the present approach is easily scalable. It can notably be applied to aircrafts weighting hundreds of kilograms to hundreds of tons and ranging from high-speed planes to hyperplanes to space planes.

All this is now described in detail, in reference to particular embodiments of the invention. To start with, the fasteners preferably secure the tiles at the level of central areas thereof, as now discussed in reference to FIGS. 2-5. In embodiments, each tile 25 is secured to the aircraft structure via at least one fastener 32, 35 (and preferably only one fastener), which extends from a central area of the tile to an opposite portion of the aircraft structure 20. The fastener further extends through a medial portion of the thermal insulation material 26, so as to squeeze the latter. Namely, the fastener applies an axial force securing the tile to the opposite aircraft structure portion, thereby squeezing the medial portion of the thermal insulation material 26 between the tile and an aircraft structure element.

The central area of a tile is defined as an inner areal portion of the tile. The inner portion represent less than half (preferably less than a third or even a fourth) of the total surface of the tile, as seen from the top or bottom of the tile. The fastener may for example extend from the geometric centre of the respective tile.

The fastener may for example include a bolt or another threaded fastener forming a bolted joint, where the nut applies the axial clamping force and the shank of the bolt pins the joint, notably against lateral shear forces. For example, as seen in FIG. 5, the fasteners 32, 35 may form bolted joints clamping the respective tiles 25 with respective opposite portions of the aircraft structure 20, while squeezing medial portions of the thermal protection material 26. I.e., the fastener involves a male threaded part 32 that captures a tile 25 and joins an opposite portion of the aircraft structure 20. The male threaded part is secured with a matching female thread part 35, which compresses the aircraft structure element 20.

In variants, other types of fasteners can be contemplated, which preferably involve threaded fasteners, so as to form, e.g., screw joints, stud joints, rivets, etc. More generally, the fasteners may involve any device that mechanically joins or affixes tiles, medial portions of the thermal protection material 26, and the aircraft structure 20, together. The fastener will typically be an elongated assembly of two or more elements, assembled to form a joint, resulting in an axial tension or compression, i.e., an inward axial force securing the tile to the aircraft structure.

As evoked above, each fastener 32, 35 may notably extend from the geometric centre of its respective tile 25. However, the fastener may have to be slightly offset to allow a fluid inlet 253 to be connected to the fluidic channel embedded in the tile, in the centre thereof. Conversely, the fluid inlet may also be slightly offset, to accommodate the fastener. In addition, the fastener may possibly be slightly slanted (not shown) to better counteract constraints exerted on the tiles, e.g., upon re-entry.

Tests and simulations performed by the inventors in respect of fasteners securing tiles at their centres have demonstrated excellent mechanical properties of the resulting assemblies, be it in terms of stress resistance and thermal protection. In particular, using a single fastener (or a few fasteners) in the centre area of the tile adequately protects against possible warping due to thermal expansion of the tiles.

A single fastener is preferably used for each tile, as illustrated in FIG. 5. That is, each tile 25 may be secured to the aircraft structure 20 via a single fastener 32, e.g., a bolt including a single male treaded part 32 inserted in a matching female threaded part 35. In the example of FIG. 5, each bolted joint 32, 35 includes a male threaded part 32, which consists of a head 32h, a shank 32s, and a threaded section 32t leading to the bolt point 32p. The male threaded part 32 extends from the centre of the respective tile 25 to the opposite portion of the aircraft structure 20, i.e., an airframe element such as a spar or a rib. A through hole 256 is provided in the tile 25, ensuring a passage for the male part 32. The threaded section 32*t* actually extends through the opposite airframe element 20, so as to protrude inwardly, i.e., from the inner side of this element inside the aircraft structure. The male threaded part 32 is secured at a level of its protruding portion 32*t*, 32*p* with a matching female threaded part 35, i.e., a nut in this example. So, the female part compresses the opposite element of the aircraft structure 20. In this example, the female part is screwed from the inside of the aircraft structure 20, so as not to damage the tile. A bolted joint is a simple, yet efficient fastener, which is easily assembled. A single bolted joint per tile is sufficient to aptly secure the tile.

The male threaded part 32 may advantageously be inserted in a thermally insulating washer 29, as shown in FIG. 5. The thermally insulating washer 29 may for example be a ceramic washer. The thermally insulating washer 29 is arranged on the side of the female threaded part 35, so as to be compressed by the latter. In detail, the thermally insulating washer 29 is shaped as a flange nut having a (narrow) upper portion and a flange, where the flanged is substantially wider than the upper portion. The female threaded part 35 abuts against the flange, to clamp the opposite element of the aircraft structure 20. The upper portion surrounds the male threaded part 32 at the level of the opposite aircraft structure element 20. This way, there is no direct thermal contact between the bolted joint 32, 35 and the airframe 20. I.e., such a washer design makes it easy to thermally insulate the aircraft structure 20 from both the male threaded part 32 and the female part 35, and hence the respective tile.

As further seen in FIG. 5, the outermost portion 32*h* of the fastener 32, 35 may advantageously be housed in a cavity 257 provided on top of each tile 25. The cavity 257 is a hollow depression provided on top of the tile. As a result, the fastener 32, 35 does not protrude outwardly from the tile. In addition, the cavity 257 may possibly be sealed, from above, e.g., using a heat-resistant material. This way, the fastener 32, 35 does not impact the aerodynamics of the aircraft.

In variants, the fasteners can be designed as blind bolts or screws, which are installed from below the heat exchanger. Such configurations are compatible with thermally insulating washers. In a back-fastening approach, the screw or blind bolt enters a threaded cavity or hollow shaft which is an integral part of the heat exchanger tile, or firmly attached to it. Such a solution too does not impact the aerodynamics of the aircraft, because the fastener does not protrude from the outer vehicle surface. In addition, the fluidic channels of the heat exchanger tile can extend in the region above the fastener in that case.

In embodiments, additional fasteners are involved (beyond the central fastener), whether in the central area or other regions of each tile. Interestingly, the additional fasteners may be designed to permit some lateral movement of the tiles, while preventing the tile from being pulled off. For example, such fasteners may be mounted in oversized holes or horizontal slits provided in the aircraft structure.

Remarkably, the flexible thermal insulation between the tile and aircraft structure allows for thermal expansion of the heat exchanger tile by conforming to dimensional changes (typically on the order of millimetres). The thermal insulation also distributes mechanical loads, in particular aerodynamic pressure forces, to the underlying aircraft structure in regions where the tile is freely supported by the structure, i.e., not mechanically fastened.

Figures 3, 4:
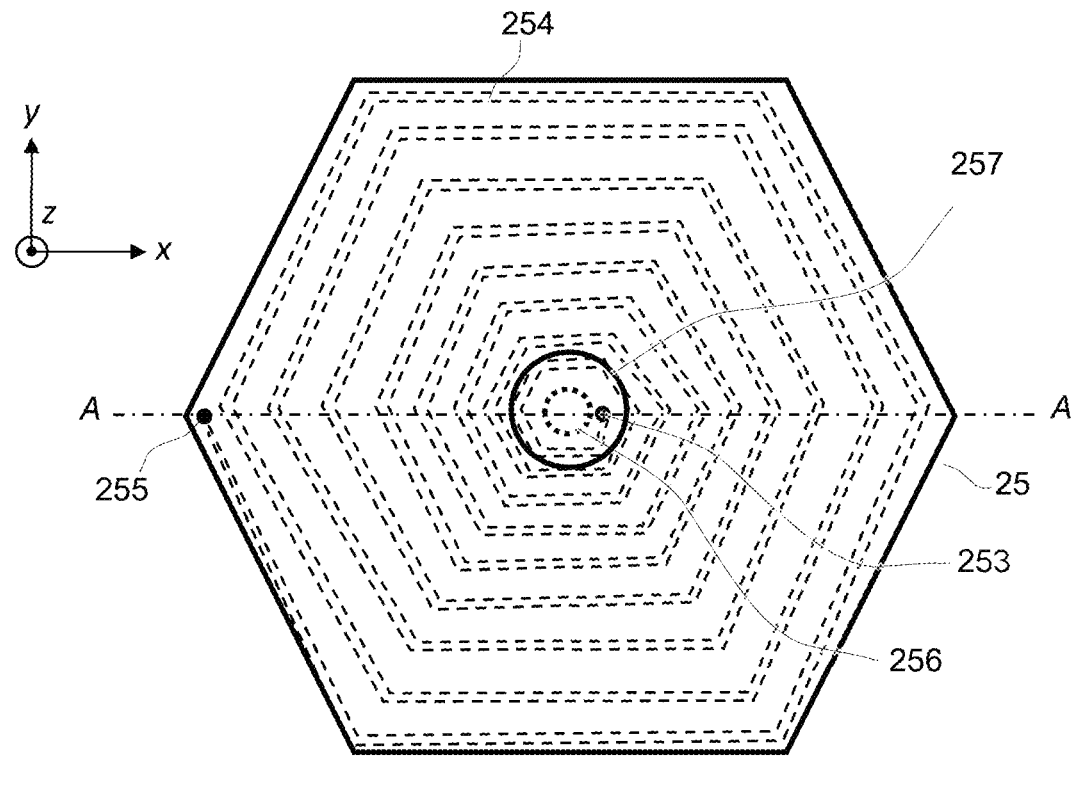
FIG. 3 is a front (or top) view top view of a hexagonal heat exchanger tile, which embeds fluidic channels (dashed lines), according to embodiments.
FIG. 4 is a 2D cross-sectional view of a heat exchanger tile such as shown in FIG. 3 (along the cross-sectional plane corresponding to the line A-A in FIG. 3). The tile includes two layer bonded by diffusion bonding, where the lower layer is grooved, so as to form a serpentine-like fluidic channel, as in embodiments.

The following describes the tiles and the embedded fluidic channels in detail. Referring back to FIG. 3, the embedded fluidic channels 254 may advantageously draw an essentially two-dimensional pattern, which extends over a greater part of the surface (in projection) of the respective tiles 25. This makes it possible to uniformly cool down the entire tile. In addition, the channel(s) itself may cover a substantial part of the tile. That is, the projected surface of the embedded channels 254, as projected on the average plane of the respective tiles, may represents at least 40% of a tile. Still, higher ratios can be contemplated. For example, the projected surface of the embedded channel(s) 254 may represent more than 55% of the surface span of each tile, or even more than 63% (e.g., 70%). In further embodiments, the projected surface of the channel(s) represents more than 80% or, even, more than 90% of the average surface of each tile. In the examples of FIGS. 3-5, each tile is assumed to embed a single channel. E.g., each tile may include a single channel having a serpentine or coiled arrangement. In variants, the channel may form meanders, as in microfluidic channels of microfluidic devices. In other variants, two or more channels may form interdigitated patterns. In general, the topology of the channels 254 (from its central part 253 to its outer part 255) inside the heat exchanger tiles 25 can be optimized to ensure an efficient cooling of the tiles.

Temperature hot spots can be avoided by increasing the coverage of the fluidic channel(s) and using high-conductivity metals (e.g., comprising or consisting of aluminium). High-conductivity metals usually have a limited operating temperature, typically in the range of 200 to 400° C. Yet, the heat exchanger tiles can be designed to support higher operating temperatures, e.g., using austenitic nickel-chromium-based superalloys (such as Inconel®) or other superalloys. In such cases, one may advantageously seek to increase the coverage of the fluidic channel(s) to compensate for the low thermal conductivity of the tile material.

As further seen in FIGS. 3-5, each fluidic channel 254 may advantageously extend from a fluid inlet 253 (arranged in the central area of the respective tile) to a fluid outlet 255 arranged in a peripheral area of the tile. Each of the fluid inlet 253 and the fluid outlet 255 is connected to the fluid-based cooling circuit 70-73. This circuit typically connects one or more coolant reservoirs 70 to the fluid inlet 253 and the fluid outlet 255, via one or more evaporators 70, which may actually form part of the reservoir, as assumed in FIGS. 6A and 6B. The cooling circuit is typically designed as a closed-loop circuit. Circuit portions 71 branch into the inlet 253, while sections 72 branch from the outlets 255, to connect the tiles, see FIG. 5. Having the fluid inlet 253 in the central area makes it possible to optimize the cooling, given that central portions of the tiles 25 are typically the hottest, in operation, as the present inventors verified by way of simulations and experimentations. In the example of FIGS. 3-5, the fluid inlet 253 is slightly shifted, laterally, with respect to the passage 256 provided for the male part 32 of the fastener. The design shown in FIGS. 3-5 makes it possible to transport the coolant fluid along a single fluidic channel that spirals outwards from the central area towards the peripheral area of the tile. This way, the coolant visits every area of the tile.

Using a single fluidic channel avoids possible problems with coolant distribution arising with branched channels and circumvents the fabrication of complex inlet and outlet manifolds. Still, more sophisticated channel layout can be contemplated. E.g., the single fluidic channel can be replaced by two or more parallel fluid channels, branching from a single (normally wider) upstream channel. The channel redundancy avoids certain types of failure. For example, assumed that three parallel fluidic channels are used, which cover 90% of the tile area. In that case, a puncture in a branched fluidic channel would result in a loss of pressure that would only impact 30% of the heat exchanger tile.

The global heat transfer coefficient of the heat exchanger tile and its coolant pressure drop can be tuned by adjusting the cross-sectional area of the fluidic channel(s). This target performance is further impacted by the length of the channel, which can also be modified by varying the size of the heat exchanger tile. Internal area extensions in the fluidic channel(s) can be obtained using fins or surface roughness. Moreover, surface corrugation can be used to increase the heat transfer coefficient, whether globally or locally. In addition, fluidic valves can be used to improve the coolant fluid distribution within fluidic channels, especially in the vicinity of corners and turns in the channels, if necessary.

Referring back to FIG. 4, each heat exchanger tile 25 may advantageously include two bonded layers 251, 252. An inner side of one layer, or of each of the two layers can be grooved to form one or more fluidic channels 254 after assembly of the two parts 251, 252. For example, each tile may include two steel sheets 251, 252, where the channels are engraved on the inner side of one of the steel sheets, e.g., by laser or any other suitable technology. This way, clean, default-free channels can easily be achieved. In the example of FIG. 4, the bottom layer 252 is engraved to form a single, serpentine channel 254. This layer 252 must be sufficiently thick to provide sufficient mechanical stability. The mechanical stability of the tile is otherwise ensure ensured by the additional layer(s) 251. Beyond channels, this layer may include various structures formed thereon or therein, such as a fluidic inlet 253 and outlet 255. Preferably, a characteristic depth of the channels is in the millimetre-length range, i.e., between 0.1 mm and 5 mm (and more preferably between 0.5 mm and 2 mm). Widths (e.g., as measured in-plane) for the channels and inlet/outlet structure will typically be in the centimetre-length range. Note, the channels may possibly include microscale fins and area extensions.

Each tile 25 may possibly include one or more additional layers, beyond the two bonded layers 251, 252. The bonded layer may for instance be covered by a thin heat shield layer, e.g., comprising a silica ceramic, a porous silicon material, or a reinforced carbon-carbon material. In preferred variants, however, the tiles simply consists of two bonded layers 251, 252, such as metal plates, as assumed in FIG. 4. The active cooling should, in principle, be sufficient to suitably cool down the tiles, without it being needed to add further heat-protection layers. The bottom layer 252 may possibly be corrugated. The bottom layer 252 may further be desensitized to thermal expansion stress by attaching the fluidic channel to the top heat exchanger plate, such that it has double sidewalls along the complete channel length or along part of the channel length. This allows the fluidic channel or part of the channel to expand freely without influencing the adjacent parts of channel.

The two layers 251, 252 composing the tile are preferably bonded (i.e., attached) by diffusion bonding. Diffusion bonding is a solid state joining process, which allows compact tiles to be obtained, with high performance. One or each of the two layers (i.e., plates) 251, 252 is first engraved to form the channels 254. The layers 251, 252 are then bonded at high temperature, under high pressure, yet without melting the plates, so as not to damage the channels. Thus, the size and shape of the flow paths remain unaffected, which allows the integrity of the flow to be maintained. The interfacial areas between the two plates are welded together as atoms intertwine under the diffusion bonding process. No brazing flux or filler is needed, resulting in a high-integrity, high-strength, and satisfactory heat transfer performance. In variants, other methods than diffusion bonding may be used to bond the layers, such as a hot isostatic pressing (hipping). Optionally, the peripheral edges of the heat exchanger tiles may be attached using traditional welding.

Various other methods can be contemplated to process the channels and obtain a suitably structured tile. For example, chemical etching, additive manufacturing, and superplastic forming techniques can be used. Such techniques can be used to obtain integral tiles, in which fluidic channel walls are provided. All such techniques make it possible to lower defects and stress concentrations that would otherwise result from usual fabrication operations and attachment methods, such as methods relying on brazing and welding.

Figure 2:
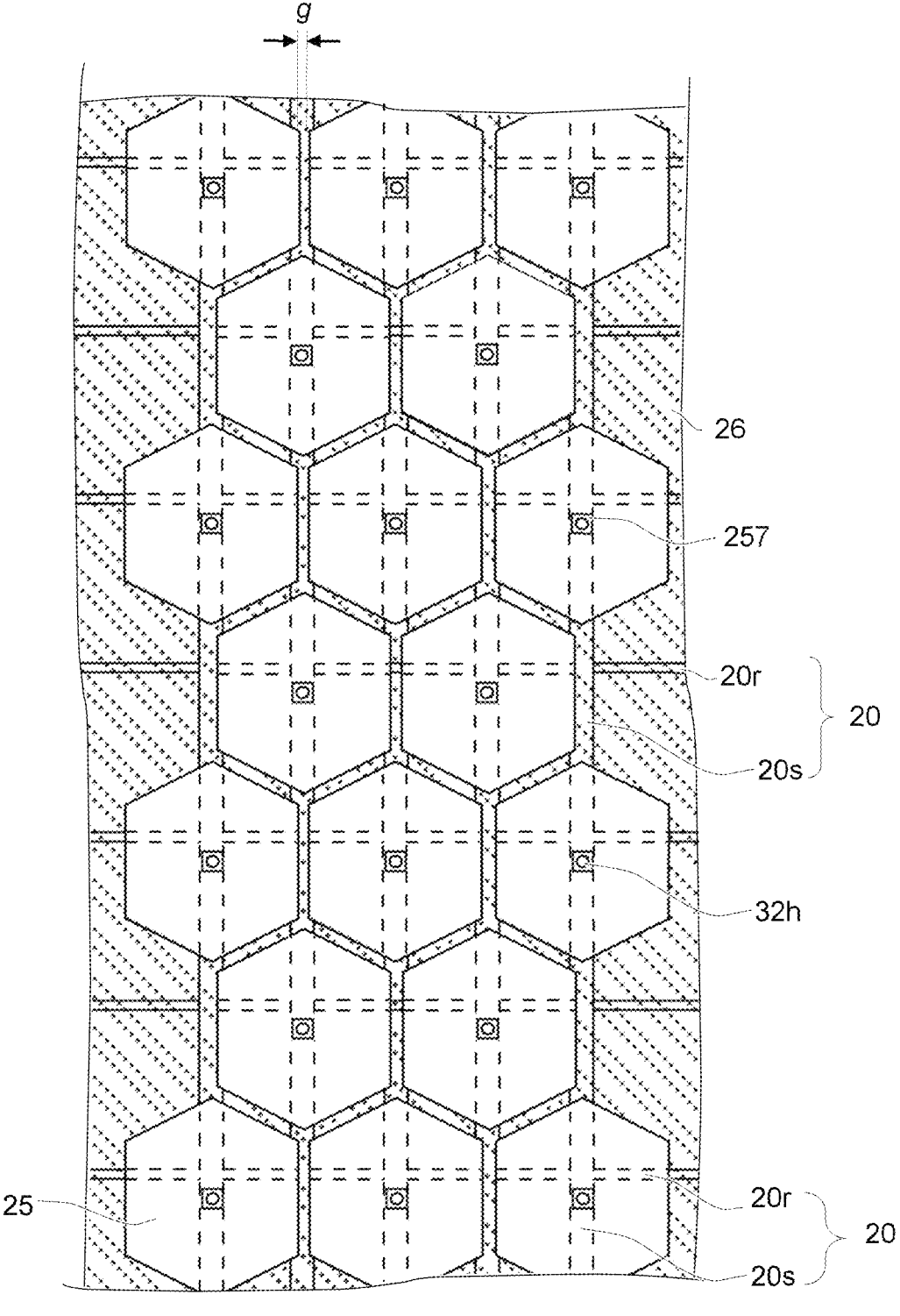
FIG. 2 is a front view of a compact arrangement of heat exchanger tiles on a portion of the aircraft structure, according to embodiments. Some of the tiles are purposely not depicted, to reveal the underlying thermal insulation layer, itself resting on aircraft structure elements, as in embodiments.

As seen in FIG. 2, at least some, if not most or all of the heat exchanger tiles 25 may have a hexagonal shape, to notably allow compact 2D tiling arrangements to be achieved, as shown in FIG. 2 (not all tiles are depicted in FIG. 2, for the sake of depicting the structural elements underneath the tiles). Other polygonal shapes, such as rectangles and squares can be contemplated too. However, using hexagonal shapes makes it possible to decrease the overall lengths of the peripheral joints (in plane). All the more, an additional benefit of using hexagonal shapes is that their high symmetry ensure improved properties of the tiles upon expanding under thermal stress. I.e., each tile expands more uniformly in each direction, thereby laterally compressing the outer skin, which reinforces the integrity of the skin. That is, upon expanding, hexagons better propagate lateral constraints to one another, almost isotropically, compared with other shapes such as oblique, rectangular, or square tiles. In other words, the thermal expansion of non-hexagonal tiles puts the integrity of the skin at greater risk, compared to hexagonal tiles. Still, tiles of different shapes and dimensions may be used, locally, to complement the hexagons and complete the skin of the aircraft, or the skin portion meant to be formed by heat exchanger tiles. Sliding mechanical connections such as bayonet clips can optionally be used to guide the movement of adjacent heat exchanger tiles when expanding.

The average diameter of the tiles will typically be between 10 and 100 cm, preferably between 20 and 40 cm. Their thickness shall typically be between 3 and 10 mm. Note, such thickness values do not take into account the insulation layer thickness, which may be significant in some cases. E.g., the combined thickness of a tile and the insulation layer may typically be between 10 and 50 mm. In general, the dimensions of the tiles and the characteristics of the embedded circuit can be optimized, together with characteristics and performance of the cooling circuit (e.g., fluidic coolant type, coolant temperature profile, flow rate, etc.) with respect to the cooling performance to be achieved, which depend on the aircraft specification.

As further seen in FIGS. 2 and 5, the heat exchanger tiles 25 are arranged so as to provide residual gaps g between the tiles 25 under standard ambient temperature and pressure. I.e., the tiles 25 do initially not form a sealed structure. Such lateral gaps g will typically be between 1 and 10 mm, this depending on other characteristics of the aircraft, starting with the effective, mean coefficient of linear thermal expansion of the tiles 25. Since the tiles may be made from different materials, one speaks of effective coefficients of linear thermal expansion, calculated as averages over a certain temperature ranges. In the present case, this coefficient will, on average, typically be between 4 and $20 \times 10^{-6}$ $K^{-1}$, for temperatures ranging from about $-150°$ C. to $800°$ C. Preferably, the effective coefficient of linear thermal expansion of the tiles is between 10 and $15 \times 10^{-6}$ K$^{-1}$. For example, in operation, a hypersonic aircraft (or spacecraft) may have a cruise speed of Mach 10, whereby the tiles 25 will typically be heated to temperatures between 100° C. and 400° C., causing a thermal expansion of approximately 0.5 to 2.5 mm for a 30 cm diameter heat exchanger tile, which in turn, will cause to close the gaps.

To sum up, the design of the outer, unsealed shell of the aircraft may advantageously consist of a matrix of heat exchanger tiles shaped as hexagons, where a small gap is initially provided between the tiles, so as to leave room for thermal expansion due to aerodynamics heating. The initial gap (under ambient pressure and temperature) can advantageously be optimized to result in full closure of the gaps under certain temperature conditions, as obtained above certain speeds and for certain air pressures. Such a thermal expansion may further be optimized to result in lateral constraints reinforcing the strength of the structure.

Figure 6A:
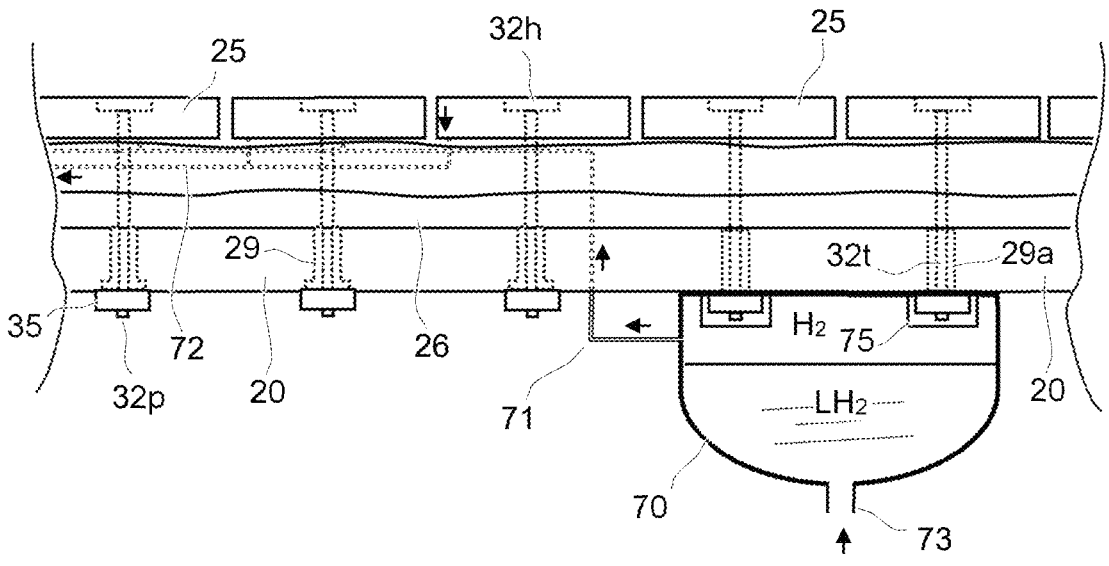
FIGS. 6A and 6B show evaporators of a fluid-based cooling circuit, where the evaporators are arranged in thermal contact with the heat exchanger tiles, as in embodiments.
Figure 6B:
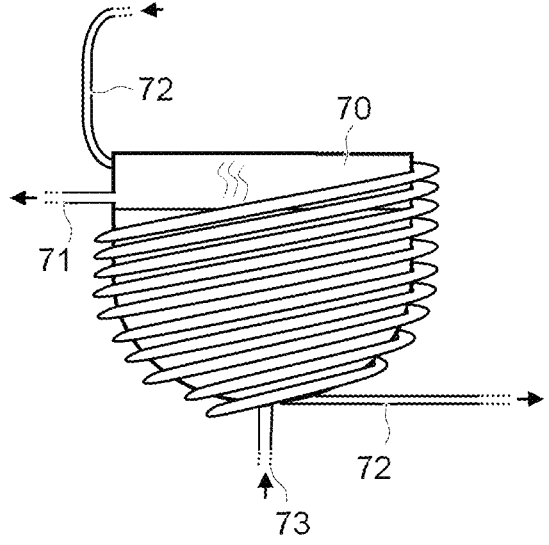

The following addresses embodiments harnessing aerodynamic heating, while flying the aircraft, to evaporate a liquid coolant and form the cooling fluid as a gas, which gas is then used to actively cool down the tiles 25. Referring to FIGS. 6A and 6B, the fluid-based cooling circuit 70-73 may notably include one or more evaporators 70, which are arranged in thermal contact with the tiles 25, so as to harness aerodynamic heating. In the present context, "thermal contact" means that the evaporators mechanically contact one or more parts (e.g., fasteners, substructures, or the heat exchanger tiles themselves) that are good thermal conductor and directly contacts the tiles. In principle, the evaporators may be arranged in direct mechanical contact with the tiles. However, an indirect contact is preferred, for security reasons (to preserve the physical integrity of the circuit). Nevertheless, the idea is to harness the heat of the tiles (e.g., on re-entry) to help evaporate the liquid coolant. Thus, sections of the fluid-based cooling circuit can be placed in direct mechanical contact with the tiles or, more preferably, with an intermediate structure, which will substantially heat when operating the aircraft at high speed. Using built-in evaporators 70 in thermal proximity with the heat exchanger tiles makes it possible to quickly change the refrigerant flow rate when the external heat flow changes. This helps balancing the external heat input and refrigerant heat extraction.

In the example of FIG. 6A, the evaporator 70 is shown to be in direct mechanical contact with some fasteners 32, 35. Now, such fasteners (typically metal bolts) transmit heat from the tiles, whereby aerodynamic heating is exploited to help evaporate the coolant (e.g., LH$_2$) and form a gas that is then injected to inlets of the tiles 25. For example, the evaporator may be made from a good thermal conductor (e.g., metal), including cavities 75 on top, in which the female threaded parts 35 are housed, hence allowing direct mechanical contact between the male parts 32 and the evaporator casing, while avoiding direct contact between the fastener 32, 35 and the coolant, for security reasons. The gas formed (e.g., H$_2$) exits the evaporator via a circuit portion 71, which connects to channel inlets 253 of the tiles. The gas formed, which can be referred to as the "cold" refrigerant vapour, is accordingly circulated in the embedded channels 254, which causes to cool down the tiles 25. The hot refrigerant vapour (once heated up by the tiles 25) can then be collected by further circuit portions 72 from the channel outlets 255 of the tiles. The circuit portions 72 can for instance direct the hot refrigerant vapour to a condenser (not shown). A pump (not shown) may be used to re-inject the condensed liquid in reservoirs (or evaporators) 70. Of course, more sophisticated cooling circuit designs can be contemplated. In particular, the cooling circuit and the rocket engines may use the same liquid (e.g., LH$_2$), such that the cooling circuit and the engines may be connected to a same LH$_2$ reservoir.

In variants, or in addition to embodiments such as depicted in FIG. 6A, each or some of the cooling circuit portions 72 (at the outlets of the tiles) may advantageously be coiled around evaporators 70, as depicted in FIG. 6B. An outlet circuit portion 72, which branches from outputs of one or more tiles, is coiled around an evaporator 70. The hot refrigerant vapour it contains transfers heat to the reservoir, which helps evaporate the liquid contained in the evaporator 70. The circuit portion 72 then redirects the hot refrigerant vapour toward a condenser. The outlet 71 branches into one or more tiles 25 to bring the cold refrigerant vapour to the fluidic channels 254 embedded in such tiles. The inlet 73 is used to fill the evaporator with liquid.

Figure 7:
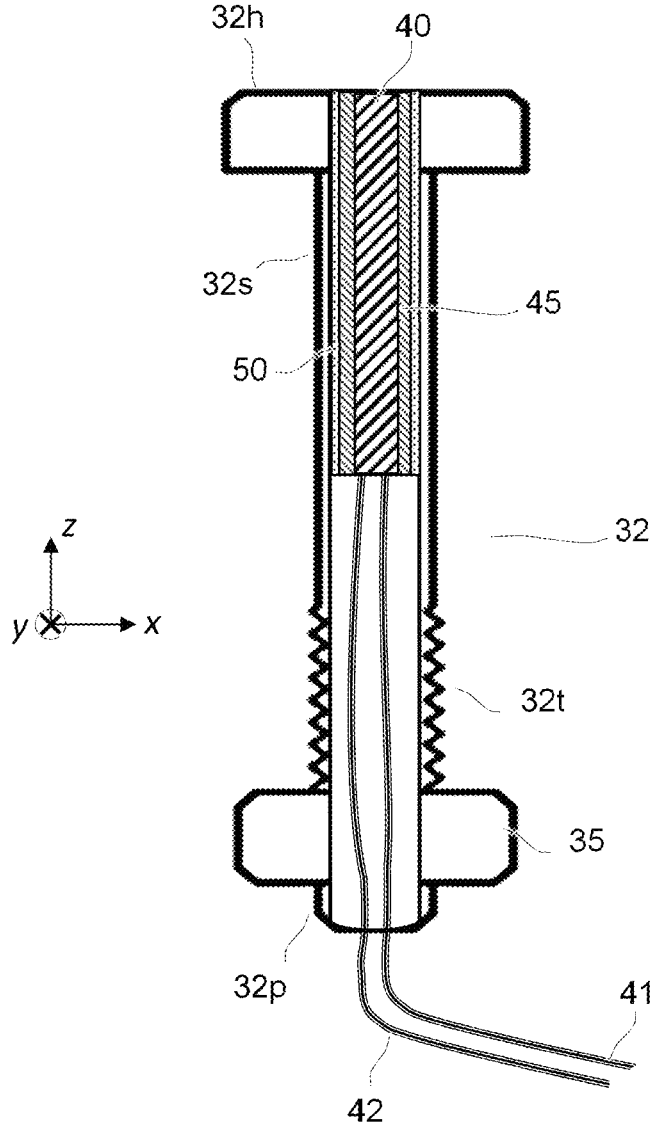
FIG. 7 is a 2D cross-sectional view of a fastener, designed as a bolt joint, where the male treaded parts embeds a sensor, as in embodiments.

The following paragraph addresses embodiments where sensors are embedded in the fasteners 32, 35, in reference to FIG. 7. Sensing devices can thus be placed in the vicinity of the outer shell of the aircraft, without impacting the aerodynamics or the tiling. As explained earlier, the fasteners 32, 35 may notably include male treaded parts 32, some (at least) of which may embed at least one sensor 40. As seen in FIG. 7, a sensor 40 may be surrounded by a thermal insulation shell 45, itself embedded in a male treaded part 32. The thermal insulation shell 45 may for instance comprise ceramic. A bonding layer 50 may further be provided between the thermal insulation shell 45 and the inner wall of the male treaded part 32, to secure the sensor 40. Several types of sensors may be provided, such as temperature sensors, pressure sensors, radiation sensors, and antennas. Various types of signals may accordingly be sensed by the sensors, so as to optimally operate the aircraft. Electrical/signal transmission connectors 41, 42 connect the sensor 40 to a receiving unit.

Figure 8:
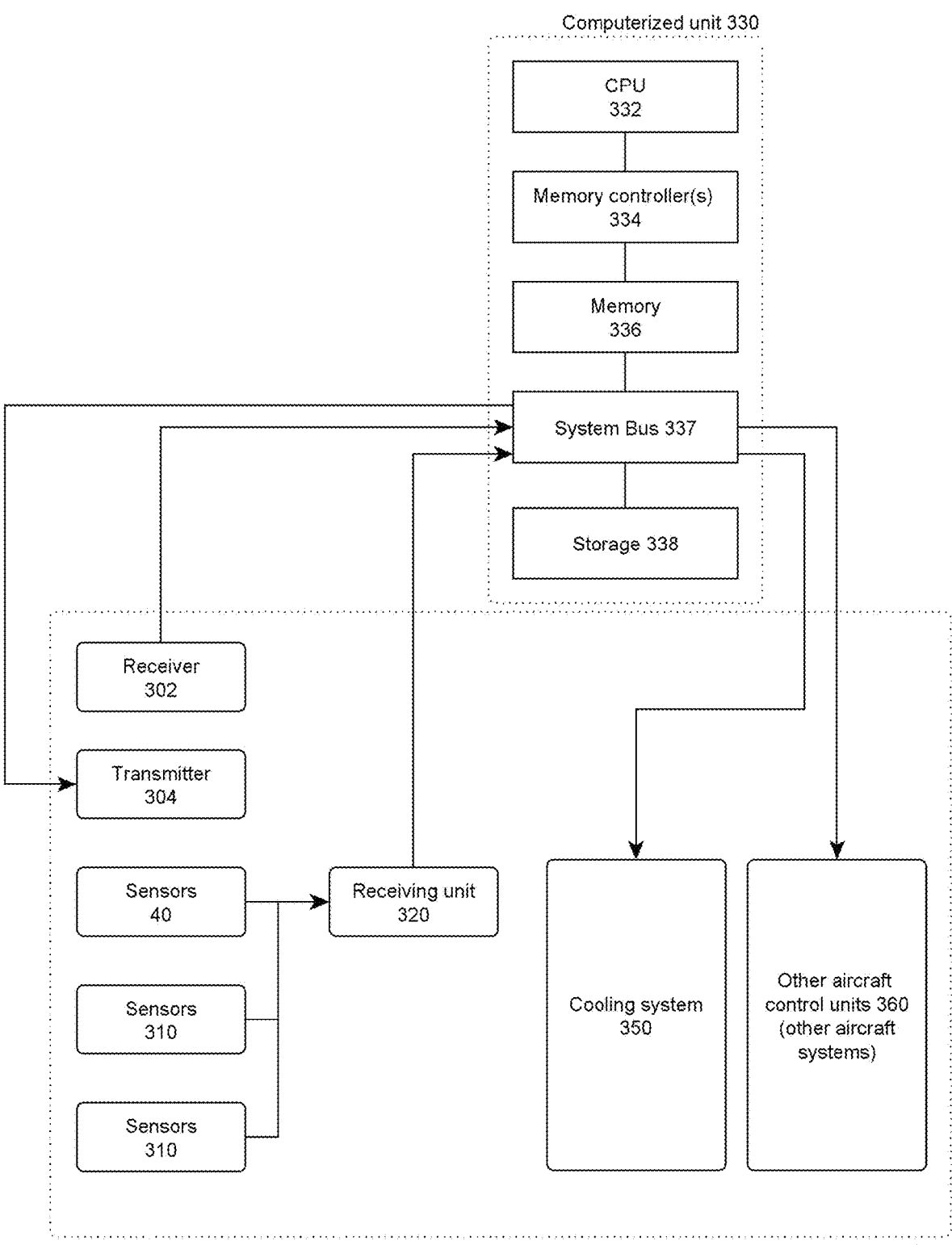
FIG. 8 is a block diagram schematically illustrating selected components of an aircraft control and sensing system, as involved in embodiments.

In that respect, the aircraft may be equipped with an advanced control and sensing system 300. A high-level diagram of an example of such a control and sensing system 300 is shown in FIG. 8. The overall control system 300 likely includes a variety of control units 350, 360 dedicated to usual aircraft operations, which requires partial or total automation of some of the aircraft systems (attitude/flight control system, landing gear, avionics, etc.). One of these systems is the cooling system 350, which notably controls the operation of the fluid-based cooling circuit 70-73. In particular, the cooling system 350 may cause to adapt the coolant flow rate and temperature based on signals sensed by aircraft sensors (e.g., embedded sensors 40). Thus, an adaptive cooling scheme can be obtained, thanks to sensors that optimally sense physical parameters of the aircraft skin.

The aircraft control and sensing system 300 may further include one or more receivers 302 (e.g., antenna receivers), e.g., configured to receive signals from remote units (e.g., forming part of checkpoints or control towers), which they can possibly pre-process and then forward to a computerized unit 330, where such signals can be further processed by software executing on the computerized unit 330, typically at a central processing unit (CPU) 332 of the unit 330. The latter may accordingly instruct to forward control signals to the various control units 350, 360. The receivers 302 may in fact be transceivers, or the aircraft may further include transmitters 304, aside the receivers 302, whereby the control system 300 can transmit data to external units. Various telemetry values will typically be received and transmitted, in operation.

In the example of FIG. 8, sensors 310 are provided, e.g., including sensors 40 embedded in the fasteners 32, 35, which are configured to detect events or changes in the environment of the aircraft. The sensors accordingly produce signals, which are transmitted to a receiving unit 320. The computerized system 330 is connected to the receiving unit 320, so as to receive signals from this unit 320. Similarly, the computerized system 330 receives and processes signals from the receiver 302. Signals received from the sensor receiving unit 320 and/or the receiver 302 may possibly require pre-processing, in order to be exploited by software executed at the CPU 332. In operation, computerized methods, which are initially stored in the form of software in the long-term storage 338, are loaded in the main memory 336 of the system 330 to cause the processing means 332 to produce real-time signals to control the aircraft systems 350, 360 (including the cooling system 350), based on the signals received from the receivers 302 and the receiving unit 320. As usual, the system 330 may include memory controllers 334, amongst many other components and units, e.g., a system bus 337. Several computerized units 330 may be provided, which may advantageously execute software redundantly, for security of the aircraft operation. All required components for enabling aircraft operations are known per se.

When the computerized system 330 is in operation, one or more processing units 332 executes software loaded in the (main) memory 336, to communicate data to and from the memory 336 and/or the storage unit 338 (e.g., a hard drive and/or a solid-state memory), and to generally control operations pursuant to software instruction. Computerized devices can be suitably designed and configured for implementing embodiments of the present invention. In that respect, it can be appreciated that some of the methods described herein are at least partly non-interactive, i.e., automated. Automated parts of such methods will typically be implemented as a combination of hardware and software.

In that respect, referring to FIGS. 1A, 1B, and 8, another aspect of the invention concerns methods of operating an aircraft 10 such as described above. The main features of such methods have already been described, be it implicitly; they are only briefly described in the following. Basically, such methods revolves around flying an aircraft 10 and operating the fluid-based cooling circuit 70-73 to circulate a cooling fluid through the fluidic channels 254 of the heat exchanger tiles 25, with a view to cooling down the heat exchanger tiles. As discussed earlier in reference to FIGS. 6A-7, the present methods may further harness aerodynamic heating, while flying the aircraft 10, to help evaporate a liquid coolant and form the cooling fluid as a gas (e.g., $H_2$), which is circulated through the fluidic channels 254. In addition, physical quantities may possibly be sensed via sensors embedded in the fasteners 32, 35.

The above embodiments have been succinctly described in reference to the accompanying drawings and may accommodate a number of variants. Several combinations of the above features may be contemplated. For example, particularly preferred embodiments of the invention involve actively cooled heat exchanger surface tiles that are fixed onto the aircraft structure (airframe), where the cooled surface tiles are supported by a flexible thermal insulation material and connected directly to the airframe. The insulation material is clamped between the tiles and the airframe thanks to mechanical fasteners such as bolted joints or screws, hence resulting in a sandwich configuration. The fasteners are fixed in central areas of the tiles, where at least some of the fasteners may embed sensors.

The sandwich configuration involves very few elements, namely the heat exchanger tiles, the flexible thermal insulation layer, the fasteners, and the underlying structure (airframe). A limited number of mechanical fasteners are needed (typically 1 to 7 per tile, the average diameter of which can be as large as 100 cm). The sandwich configuration (whereby the heat exchanger is supported by the flexible thermal insulation layer) allows for thermal expansion of the tiles and desensitizes the structure to thermal stresses. Furthermore, the heat exchanger tiles can be operated at high temperature, while thermally insulating the underlying cold structure. Operating the heat exchanger tiles at high temperature can be leveraged to increase the value of the warm coolant for regenerative purposes, e.g., for propulsion, turbomachinery, and electrical power generation. The weight savings afforded by heat regeneration can partially offset the weight penalties of adding thermal insulation for higher temperatures.

Additional fasteners and sliding joints may be used in other areas of the heat exchanger tiles. The flexible insulation provides thermal insulation to the underlying cold airframe structure. It also gives the heat exchanger the ability to thermally deform while transmitting pressure and shear loads to the underlying airframe. The cooled tiles, which are supported by the flexible thermal insulation material, involve both an active and a passive cooling behaviour. The cooling channels, the coolant characteristics, and the thickness of the insulating blanket can be jointly optimized. Operating temperatures of the heat exchanger tiles can be adjusted with respect to desired performance and lifetime.

The following table aggregates specifications of an example of aircraft according to embodiments. Note, in variants to the above example, aluminium alloys may be used instead of Nickel superalloys, to save weight. However, aluminium alloys restrict the maximum temperature at which they can be used (typically <200° C.).

TABLE 1

| Characteristics of an example of suborbital spaceplane with active cooling system | |
| --- | --- |
| Aircraft features | |
| Cruise speed and altitude ranges | Mach 2 to 20 at altitudes between 10 km to 100 km, maximum dynamic pressures between 10 kPa and 100 kPa |
| Material | Nickel superalloy (e.g., Inconel 718) with CuCrZr coatings to improve thermal conduction and distribution or titanium alloy (with gold plating) to improve hydrogen resistance. |
| Manufacturing | Main components: additive manufacturing and diffusion bonding Fluidic channels: chemical etching and superplastic forming |
| Tile shape | Hexagonal |
| Tile dimensions | Side length: 30 cm Thickness: 10 mm Total surface area (front surface): 2338 cm$^2$ |
| Number of heat exchanger tiles | 10 to 1000 tiles, interconnected via the cooling circuit |
| Tile temperature range | Between −150° C. and 800° C. |
| Coolant medium | Supercritical $H_2$ |
| Coolant pressure | Between 2 and 100 bars (preferably between 10 and 60 bars) |

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant, or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention is not limited to the particular embodiments disclosed, but that the present invention will include all embodiments falling within the scope of the appended claims. In addition, many other variants than explicitly touched above can be contemplated. For example, other materials and dimensions than those explicitly mentioned may be contemplated.

| REFERENCE LIST | |
| --- | --- |
| Gaps between tiles g | g |
| Aircraft | 10 |
| Aircraft structure | 20 |
| Ribs | 20r |
| Spars | 20s |
| Heat exchanger tiles | 25 |
| Tile top layer | 251 |
| Tile bottom layer | 252 |
| Fluidic channel inlet | 253 |
| Embedded fluidic channel | 254 |
| Fluidic channel outlet | 255 |
| Male threaded part passage | 256 |
| Cavity | 257 |
| Thermal insulation material | 26 |
| Radiation shielding material layer | 28 |
| Shaped ceramic washer | 29 |
| Ceramic washer (for evaporator) | 29a |
| Fastener (bolted joint) | 32, 35 |
| Male threaded part (bolt) | 32 |
| Head | 32h |
| Bolt point | 32p |
| Shank | 32s |
| Threaded section | 32t |
| Female thread part (nut) | 35 |
| Embedded sensor | 40 |
| Sensor connectors | 41, 42 |
| Thermal insulation shell | 45 |
| Bonding layer | 50 |
| Fluid-based cooling circuit | 70-73 |
| Reservoir/evaporator | 70 |
| Cooling circuit portion (to tile inlet) | 71 |
| Cooling circuit portion (from tile outlet) | 72 |
| Evaporator liquid inlet | 73 |
| Aircraft control and sensing system | 300 |
| Receiver | 302 |
| Transmitter | 304 |
| Sensors | 310 |
| Receiving unit | 320 |
| Computerized unit | 330 |
| Central processing unit (CPU) | 332 |
| Memory controller(s) | 334 |
| Main memory | 336 |
| System bus | 337 |
| Long-term storage means (storage unit) | 338 |
| Aircraft systems | 350, 360 |
| Cooling system | 350 |
| Other aircraft system control units | 360 |

What is claimed is:

1. An aircraft comprising:
an aircraft structure;
a thermal exchange system including
   a fluid-based cooling circuit and
   heat exchanger tiles, which at least partly cover the aircraft structure;
a thermal insulation material; and
fasteners securing the tiles to the aircraft structure, wherein
   each tile of the heat exchanger tiles embeds one or more fluidic channels connected to the fluid-based cooling circuit, whereby the thermal exchange system is adapted to actively cool the tiles, in operation, and
   the thermal insulation material extends between the aircraft structure and the heat exchanger tiles, where it is clamped on either side by the heat exchanger tiles and by the aircraft structure, due to the fasteners.

2. The aircraft according to claim 1, wherein
each tile of the heat exchanger tiles is secured to the aircraft structure via at least one fastener extending from a central area of said each tile to an opposite portion of the aircraft structure through a medial portion of the thermal insulation material, so as to apply an axial force securing said each tile to said opposite portion and squeezing said medial portion between said each tile and said opposite portion.

3. The aircraft according to claim 2, wherein
the fasteners are bolted joints clamping the respective tiles with respective opposite portions of the aircraft structure, while squeezing the medial portions of the thermal protection material.

4. The aircraft according to claim 3, wherein
each of the bolted joints includes a male threaded part extending from a respective one of the tiles to and through an opposite portion of the aircraft structure, so as to protrude inwardly from this portion of the aircraft structure, and
the male threaded part is secured at a level of its protruding portion with a matching female threaded part.

5. The aircraft according to claim 4, wherein
the male threaded part is inserted in a thermally insulating washer, which is arranged on a side of the female threaded part, so as to be compressed by the female threaded part, and
the thermally insulating washer is shaped as a flange nut having:
   a narrow portion surrounding the male threaded part at the level of said opposite portion of the aircraft structure, so as to thermally insulate said opposite portion of the aircraft structure from the male threaded part, and
   a wide flange, against which the female threaded part abuts, to clamp said opposite portion of the aircraft structure.

6. The aircraft according to claim 2, wherein
an outermost portion of said one fastener is housed in a cavity of said each tile, such that said one fastener does not protrude outwardly from said each tile.

7. The aircraft according to claim 1, wherein
the one or more fluidic channels of said each tile draw an essentially two-dimensional pattern extending over a greater part of the surface of said each tile.

8. The aircraft according to claim 1, wherein
the one or more fluidic channels of said each tile have, each, a fluid inlet arranged in a central area of said each tile and a fluid outlet arranged in a peripheral area of said each tile, and each of the fluid inlet and the fluid outlet is connected to the fluid-based cooling circuit.

9. The aircraft according to claim 1, wherein each of the tiles embeds a single fluidic channel.

10. The aircraft according to claim 1, wherein each of the heat exchanger tiles includes two bonded layers, wherein an inner side of one or each of the two layers is grooved, so as to form said one or more fluidic channels.

11. The aircraft according to claim 10, wherein the two layers are bonded by diffusion bonding.

12. The aircraft according to claim 10, wherein most of the heat exchanger tiles have, each, a hexagonal shape.

13. The aircraft according to claim 1, wherein the heat exchanger tiles are arranged so as to provide residual gaps between the tiles under standard ambient temperature and pressure.

14. The aircraft according to claim 1, wherein the fluid-based cooling circuit includes one or more evaporators that are arranged, each, in thermal contact with the tiles.

15. The aircraft according to claim 1, wherein the fasteners include male treaded parts and one or more of the male treaded parts embed, each, at least one sensor.

16. The aircraft according to claim 15, wherein the at least one sensor is surrounded by a thermal insulation shell, itself embedded in each of said one or more of the male treaded parts.

17. The aircraft according to claim 15, wherein said at least one sensor includes one or more of a temperature sensor, a pressure sensor, a radiation sensor, and an antenna.

18. The aircraft according to claim 1, wherein each of the tiles is secured to the aircraft structure by a single one of the fasteners.

19. A method of operating an aircraft, the method comprising:

flying an aircraft-comprising:

an aircraft structure; a thermal exchange system including a fluid-based cooling circuit and heat exchanger tiles, which at least partly cover the aircraft structure;

a thermal insulation material; and fasteners securing the tiles to the aircraft structure, wherein each tile of the heat exchanger tiles embeds one or more fluidic channels connected to the fluid-based cooling circuit, whereby the thermal exchange system is adapted to actively cool the tiles, in operation, and the thermal insulation material extends between the aircraft structure and the heat exchanger tiles, where it is clamped on either side by the heat exchanger tiles and by the aircraft structure, due to the fasteners; and operating the fluid-based cooling circuit to circulate a cooling fluid through the one or more fluidic channels of each of the heat exchanger tiles, to cool down the tiles.

20. The method according to claim 19, wherein the method further comprises:

harnessing aerodynamic heating, while flying the aircraft, to evaporate a liquid coolant and form the cooling fluid as a gas, circulating the gas formed through the one or more fluidic channels.

* * * * *